United States Patent [19]

Suzuki et al.

[11] Patent Number: 4,876,603
[45] Date of Patent: Oct. 24, 1989

[54] SIGNAL PROCESSING DEVICE FOR AUTOMATIC-FOCUSING VIDEO SIGNAL IN ELECTRONICALLY CONTROLLED PHOTOGRAPHIC CAMERA

[75] Inventors: Noboru Suzuki; Shigeo Toji; Yukio Uenaka, all of Tokyo, Japan

[73] Assignee: Asahi Kogaku Kogyo Kabushiki Kaisha, Tokyo, Japan

[21] Appl. No.: 173,449

[22] Filed: Mar. 25, 1988

[30] Foreign Application Priority Data

Mar. 26, 1987 [JP] Japan .................................. 62-72916
Mar. 26, 1987 [JP] Japan ............................ 62-45016[U]

[51] Int. Cl.⁴ .......................................... H04N 5/232
[52] U.S. Cl. ..................................... 358/227; 358/228
[58] Field of Search .................... 358/227, 228, 213.19

[56] References Cited

U.S. PATENT DOCUMENTS

| | | | |
|---|---|---|---|
| 4,410,258 | 10/1983 | Aoki et al. | 354/25 |
| 4,500,925 | 2/1985 | Hanma et al. | 358/227 |
| 4,609,944 | 9/1986 | Nakada et al. | 358/228 |

Primary Examiner—Jin F. Ng
Assistant Examiner—Stephen Brinich
Attorney, Agent, or Firm—Sandler & Greenblum

[57] ABSTRACT

A signal processor for an AF video signal in an electronically controlled camera, comprising: a photosensor (20) of the self-scanning type having an electric charge accumulating part (PD) for accumulating signal electric charge therein which corresponds to the object brightness, an exposure monitor (M1', M2', M3') for accumulating electric charge therein which corresponds to the amount of the signal electric charge accumulated in said electric charge accumulating part, and a dark charge monitor (DM1') for accumulating dark charge therein, said photosensor being adapted to sequentially transmit the signal electric charge accumulated in said electric charge accumulating part for transfer to an A/D converter (34); and an automatic gain control circuit (37) for amplifying, thereby automatically gain-controlling, the AF video signal produced from said photosensor when said object contrast is low, in such a manner that a low-contrast corresponding level difference, which is the difference between a high-luminance corresponding level and low-luminance corresponding level of an AF video signal arising from a low-contrast object, approaches a high-contrast corresponding level difference, which is the difference between a high-luminance corresponding level and low-luminance corresponding level of an AF video signal arising from a high-contrast object.

10 Claims, 12 Drawing Sheets

SIGNAL PROCESSING DEVICE FOR AUTOMATIC-FOCUSING VIDEO SIGNAL IN ELECTRONICALLY CONTROLLED PHOTOGRAPHIC CAMERA

BACKGROUND OF THE INVENTION

1. Field of the Invention

The present invention relates to an improvement in a signal processing device for an automatic-focusing video signal in an electronically controlled photographic camera.

2. Related Prior Art

Electronically controlled photographic cameras have in general an automatically focusing optical system provided therein for detecting focuss conditioning of the object to be photographed. FIG. 18 is a schematic diagram showing the arrangement of such automatic-focusing optical system, wherein 1 denotes a taking lens, 2 the object to be photographed, 3 a visual field mask, 4 a condenser lens, 5 a diaphragm mask, 6 and 7 a separator lenses forming an image splitting optical element, and 8 a photosensor. The automatic-focusing optical system consisting of these elements is referenced 9.

In the automatic-focusing optical system 9, the visual field mask 3 is positioned near a film-equivalent plane 10, which plane 10 is in optically conjugate positional relationship with the object 2 through the taking lens 1; on the film-equivalent plane 10 there is formed a sharp image 11 of the object 2 when the taking lens 1 is in suitably focused. The condenser lens 4 and the diaphragm mask 5 has the function of splitting the light passing through the taking lens 1 into two separate beams; the separator lenses are situated in a position wihich is optically conjugate with the taking lens 1 through the condenser lens 4. The image 11 of the object formed on the film-euivalent plane 10 is reproduced by the separater lenses 6 and 7 as images 11' on two regions of an electric-charge accumulating part PD of the photosensor 8.

Assuming that the spacing between the suitably focused reproduced images 11' is $l_0$, as shown in FIGS. 19 (a) and 20, the spacing between the images is narrower than $l_0$ when the taking lens 1 is positioned to focus before the plane 10 as shown in FIG. 19 (b), but the spacing between the reproduced images is wider than $l_0$ when the taking lens 1 is positioned to focus behind the plane 10. Since the change in the spacing between the reproduced images is proportional to the amount of defocuging of the taking lens 1, the spacing is measured and the data is processed by an AF-CPU (a central processing unit for automatic-focusing) so as to move the taking lens 1 depending on the direction and extent of defocusing of the lens 1 thereby to position the lens 1 at the suitably focusing position.

In order to perform such process, it is necesary to process the AF video signal from the photosensor 8 in a predetermined manner. Electronically controlled cameras have a sinal processor for processing the AF video signal for performing such predetermined process.

The signal processor for the AF vidio signal comprises: a self-scanning photosensor having a charge accumulating part for accumulating electric signal charge therein which corresponds to the luminance of the object, an exposure monitor for accumulating electric charge therein which corresponds to the electric signal charge accumulated in said electric charge accumulating part, and a dark-charge monitor for accumulating dark electric charge, said self-scanning photosensor being adapted to sequentially transmit the singnal charge, which has been accumulated in said elctric charge accumulating part, as the AF video signal; and a comparing curcuit for setting a reference level by shifting the output level from the dark-charge monitor in such a manner that the potential of the electric signal charge accumulated in the charge accumulaing part is driven to a predetermined level, and for providing, upon reversal of the reference level and the output level from the exposure monitor, an output signal which causes the AF-CPU to provide a command to cause the signal electric charge accumulated in the electric charge accumulating part to be transferred. In this signal processor for the AF video signal, the transfer command from the AF-CPU is used to drive a driving circuit for causing the signal electric charge accumulated in the electric charge accumulating part to be sequentially transferred as the AF video signal to an analog-to-digital (D/A) converter.

Meanwhile, a dark, low-contrast object will cause a relatively small amount of signal electric charge to be accumulated in the electric charge accumulating part, and will thus produce an AF video signal whose low-contrast corresponding level difference, which is the difference between high-luminance corresponding level thereof and the low-luminance corresponding level thereof, is relatively small. Thus, there is a disadvantage in that the AF-CPU cannot produce proper distance data using the AF video signal arising from such low-contrast object, since the repetition pattern in such AF video signal is weak.

SUMMARY OF THE INVENTION

An object of the present invention is therefore to provide a signal processor for an AF video signal in electronically controlled cameras, in which a gain control is performed to magnify to near the appropriate process range limits.

A bright, but low-contrast, object will likewise provide a weak repetition pattern. Thus, it is then preferred that a gain control be performed for the AF video signal similarly to the case of the dark low-contrast object. Since the level of the AF video signal is generally lowered, the bright but low-contrast AF video signal itself can, when amplified, exceed the limit process level which is the limit under which a proper process can be performed.

Another object of the present invention is to provide a signal processor for an AF video signal in electronically controlled camera, in which, when a bright low-contrast AF video signal is processed, the general level of such AF video signal is adjusted to approach the gneral level of a dark low-contrast AF video signal before it is amplified.

As described above, where processes of amplifying and level-shifting of the AF video signal are performed, a changeover from a low-contrast object to a high-contrast object can possibly result in an AF video signal which, after the gain control and level-shifting processes, exceeds the appropiate process range, and such AF video signal may saturate the A/D converter and may thereby be distorted.

A further object of the present invention is to provide a signal processor for an AF video signal in electronically controlled cameras, in which, if there occurs a changeover from a low-contrast object to a high-contrast object, the gain control is once removed after a level shifting process of the AF video signal.

Also, an AF video signal has an offset from the process reference level for the A/D converter, which offset depends on the circuit characteristics. There is a problem caused by the offset in that the AF video signal may not appropriately be converted into digital form unless the offset is removed before the analog-to-digital conversion.

A still another object of the present invention is to provide a signal processor for an AF video signal in electronically controlled cameras, in which the AF video signal is supplied to an A/D converter after the removal of the offset.

An aspect of the present invention is characterized in that the signal processor is provided with an automatic gain control cirtuit for automatically amplifying the AF video signal from said photosensor thereby to automatically gain-control it when the object contrast is low, so as to bring the low-contrast corresponding level difference, which is the difference between the high-luminance corresponding level and low-luminance corresponding level of the AF video signal arising from a low-contrast object, near the high-contrast correponding level difference, which is the difference between the high-luminance corresponding level and low-luminance corresponding level of an AF video signal arising from a high-contrast object.

Another aspect of the present invention is characterized in that the signal processor is provided with a level shifting circuit which, when the general level of the AF video signal corresponding to the object brightness has changed, shifts the general level of said AF video signal toward said process base level, and cooperates with said automatic gain control circuit for adjusting said AF video signal into the appropriate process range.

A further aspect of the present invention is characerized in that the signal processor is provided with an arithmetic processing unit for removing the automatic gain control, which unit is arranged to once remove the automatic gain control, when a changeover from a low-contrast object to a high-contrast object has occured, depending on whether or not the AF video signal gain-controlled and supplied to the A/D converter is within the appropriate process range.

A still further aspect of the present invention is characterized in that the signal processor is provided with an offset adjusting circuit for shifting said video signal from said photosensor thereby to adjust the offset due to circuit characteristics of said video signal from the process reference level.

DESCRIPTION OF THE PREFERRED EMBODIMENT

An embodiment of the signal processor according to the present invention for the AF video signal in an electronically controlled camera will hereinafter be described with reference to the drawings.

Figure 1:
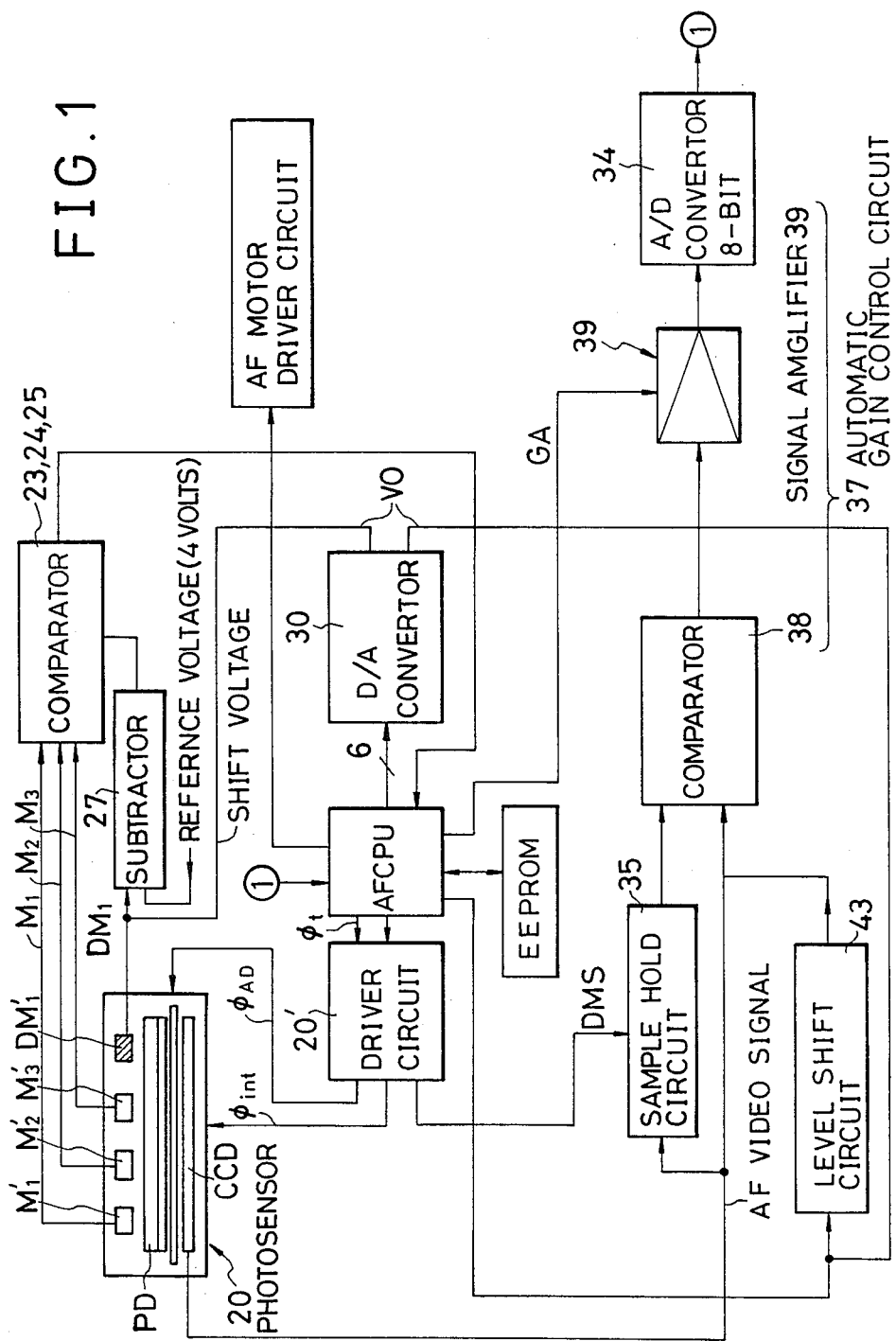
FIG. 1 is a block diagram schematically showing the circuit arrangement of an embodiment, according to the present invention, of the signal processor for an AF video signal in an electronically controlled camera.
Figure 2:
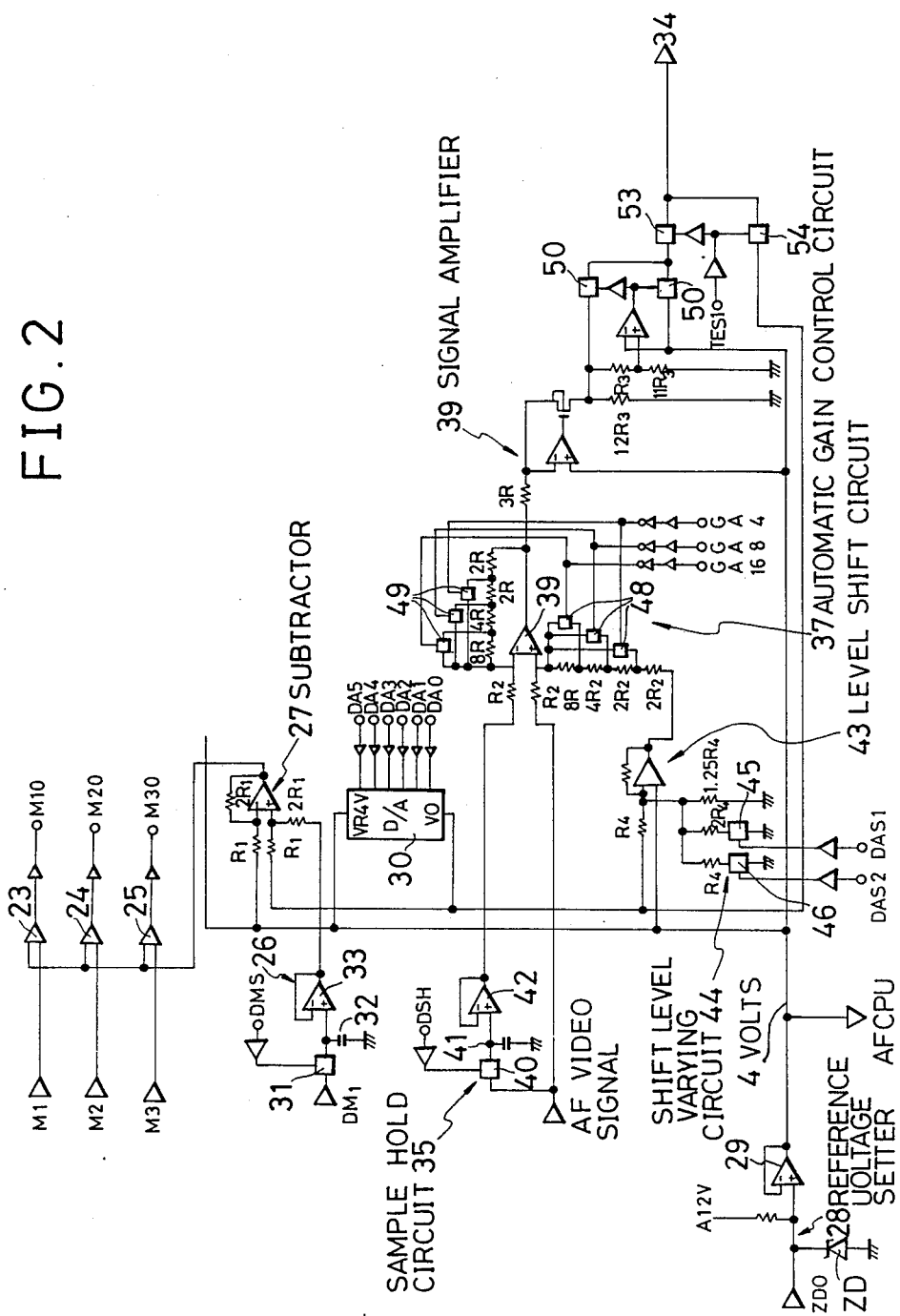
FIG. 2 is a diagram showing the detail of such circuit.
Figure 3:
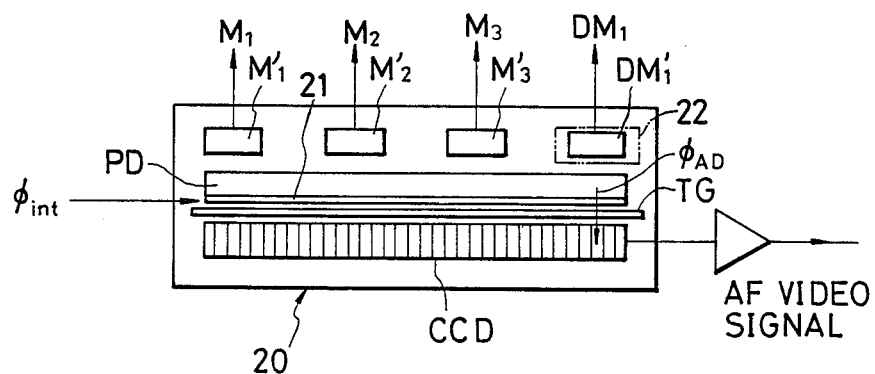
FIG. 3 is an enlarged view of a photosensor for use in the signal processor.

FIG. 1 is an overall block diagram of the signal processor, FIG. 2 a detailed circuit diagram of the signal processor, and FIG. 3 a schematic diagram showing a photosensor of the self-scanning type for use in the signal processor. In FIG. 3, 20 denotes a photosensor of, for example, the CCD (charge coupled device) type. The photosensor 20 has an electric charge accumulating part PD for accumulating signal electric charge therein, a CCD for transfer of the signal electric charge, a transfer gate TG, a drain part 21, three exposure monitors M1', M2' and M3' for accumulating electric charge therein corresponding to the signal electric charge accumulated in the electric charge accumulating part PD, and a dark charge monitor DM1' for accumulating dark electric charge therein. The dark charge monitor DM1' is covered with, for example, an aluminium film 22.

The photosensor 20 will initiate to accumulate signal electric charge upon receiving a drive command signal $\Phi_{int}$ from a CCD driving circuit 20' shown in FIGS. 1 and 2; elctric charge accumulated in the electrc charge accumulating part PD, exposure monitors M1', M2' and M3', and the dark charge monitor DM1' is released into ground through the drain part 21 until the drive command signal $\Phi_{int}$ is received.

Figure 4:
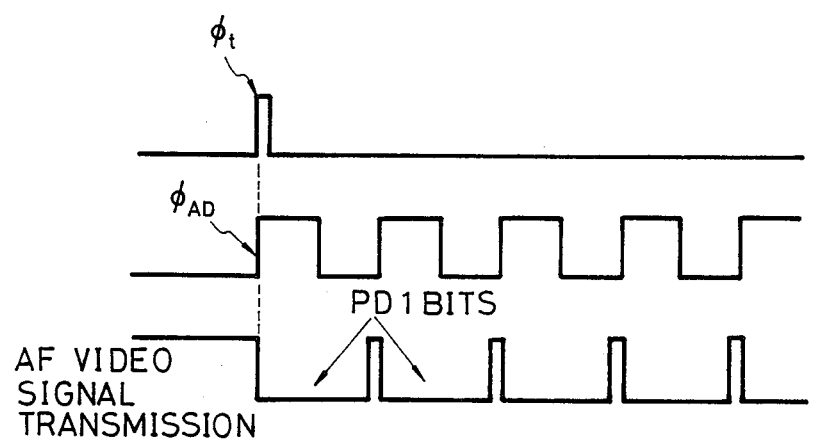
FIG. 4 is an output timing diagram of the AF video signal produced by the photosensor.

The photosensor 20 initiates to transfer the signal electric charge depending on drive command signals $\Phi_{AD}$, thereby sequentially transmitting the AF video signal bit by bit as shwon in FIG. 4. The drive command signal $\Phi_{AD}$ is outputted upon the output of a transfer gate signal $\Phi_T$. The timing of output of this transfer gate signal $\Phi_T$ will be described later. The above-described arrangement of the CCD-driven photosensor is already known.

The output signals M1, M2 and M3 from the exposure monitors M1', M2' and M3' are supplied to comparators 23, 24 and 25, respectively. The output signal DM1 from the dark charge monitor DM1' is supplied to an input of a subtractor 27 through a sample hold circuit 26. A reference voltage V1, for example V1=4 volts, is applied to the other input of the subtractor 27 through a reference voltage setting unit 28, as shown in FIG. 2. The reference voltage V1 setting unit 28 comprises a Zener diode ZD and a feedback circuit (a further circuit) 29 whose one input receives a supply voltage of 12 volts through a resistor.

Also, a shift voltage is applied to the one input of the subtractor 27. The shift voltage is produced by a D/A converter 30. The D/A converter 30 receives a 6-bit data at its inputs DA5–DA0. This converter provides a shift voltage of a reference voltage V1, for example V1=4 volts, at its output VO when the 6-bit data is "111111", and the shift voltage is 3.972 volts when the 6-bit data is "111110". In this way, the output signal voltage DM1 can be shifted stepwise at intervals of 28 millivolts in accordance with the combination of "0" and "1" for the 6-bit data. The voltage of the output signal DM1 is the reference level which will be described later.

The sample hold circuit 26 comprises a switch 31, a capacitor 32 and a feedback circuit (a further circuit) 33. The switch 31 is closed upon receiving a dark charge monitor sample hold signal DMS, and the sample hold circuit 26 has the funtion of storing therein the voltage level of the output signal DM1 from the dark charge monitor DM1' at the moment such signal DMS is received. Said dark charge monitor sample hold signal DMS is produced by the AF-CPU a preset time after the initiation of accumulation of the signal electric charge. The reason why the output signal DM1 is sample-held will be described later.

The comparators 23, 24 and 25, the subtractor 27 and the D/A converter 30, in combination, constitute a comparing circuit which sets the reference level by shifting the output level from the dark charge monitor DM1' such that the potential of the signal electric charge accumulated in the electric charge accumulating part PD can reach a predetermined level, and which, upon reversal of such reference level and the output levels of the exposure monitors M1', M2' and M3', produces an output signal causing the AF-CPU to produce a transmission command which in turn causes the electric charge accumulating part PD to transmit the signal electric charge stored therein. The function of such comparing circuit will be described with reference to FIG. 5.

The AF video signal is supplied to the A/D converter 34 (see FIG. 1) for analog-to-digital conversion, and is subsequently supplied to the AF-CPU. The A/D converter 34 has an inherent appropriate process range bounded by a process reference level and a process limit level. An AF video signal exceeding these limits cause a trouble in that it will saturate the A/D converter and will thereby be distorted. In addition, it is impossible to obtain adequete data on the distance to the object using an AF video signal arising from a low-contrast object without any further process. It is therefore preferred to use an AF video signal whose level varies as widely as possible within the appropriate process range.

Assuming that the surface of the photosensor 20 receives light uniformly, the exposure monitors M1', M2' and M3', the dark charge monitor DM1' and the electric charge accumulating part PD initiate to accumulate electric charge at the moment the drive command signal $\Phi_{int}$ is received.

The voltage levels of the output signals from the exposure monitors M1', M2' and M3' will decrease as time passes. Uniquely corresponding to this, the voltage level of the signal electric charge accumulated in the electric charge accumulating part PD decreases. The dark charge monitor DM1' receives no light, but dark charge is accumulated as time passes, so that the voltage level ADL of the output signal DM1 also decreases. Here, the voltage level ADL of the output signal DM1 is shifted downwardly by a predetermined amount. Since the exposure monitors M1', M2' and M3' receives light, the voltage level A of the output signals M1, M2 and M3 will decrease faster than the reference level ADL' which is the sifted level of the output signal DM1.

In this embodiment, since the shifted voltage level ADL' is sampled and held at the moment the dark charge monitor sample hold signal DMS is produced, the shifted voltage level ADL' is constant after the sample-holding. After a certain period of time, the voltage level A and such constant level, labeled ADL'', are reversed or transposed together. The reason for the sample-holding of the output signal DM1 is that, without such sample-holding, the reversal in voltage level of the reference level and the output signals M1, M2 and M3 sometimes never occurs when dark charge is rapidly accumulated in proportion to temperature rise which causes a rapid decrease of the voltage level of the output signal DM1.

Upon reversal of the reference level ADL'' and the voltage level A, the outputs from the comparators 23, 24 and 25 are inverted and the inverted signals M10, M20 and M30 are supplied to the AF-CPU. Depending on these inverted signals M1O, M20 and M30, the AF-CPU produces a transfer gate signal $\Phi_t$ as shown in FIG. 4. Subsequently, the CCD driving circuit 20 produces a drive command signal $\Phi_{AD}$ depending on the output of the transfer gate signal $\Phi_t$, as shown in FIG. 4, and the AF video signal is produced from the photosensor 20.

Figure 5:
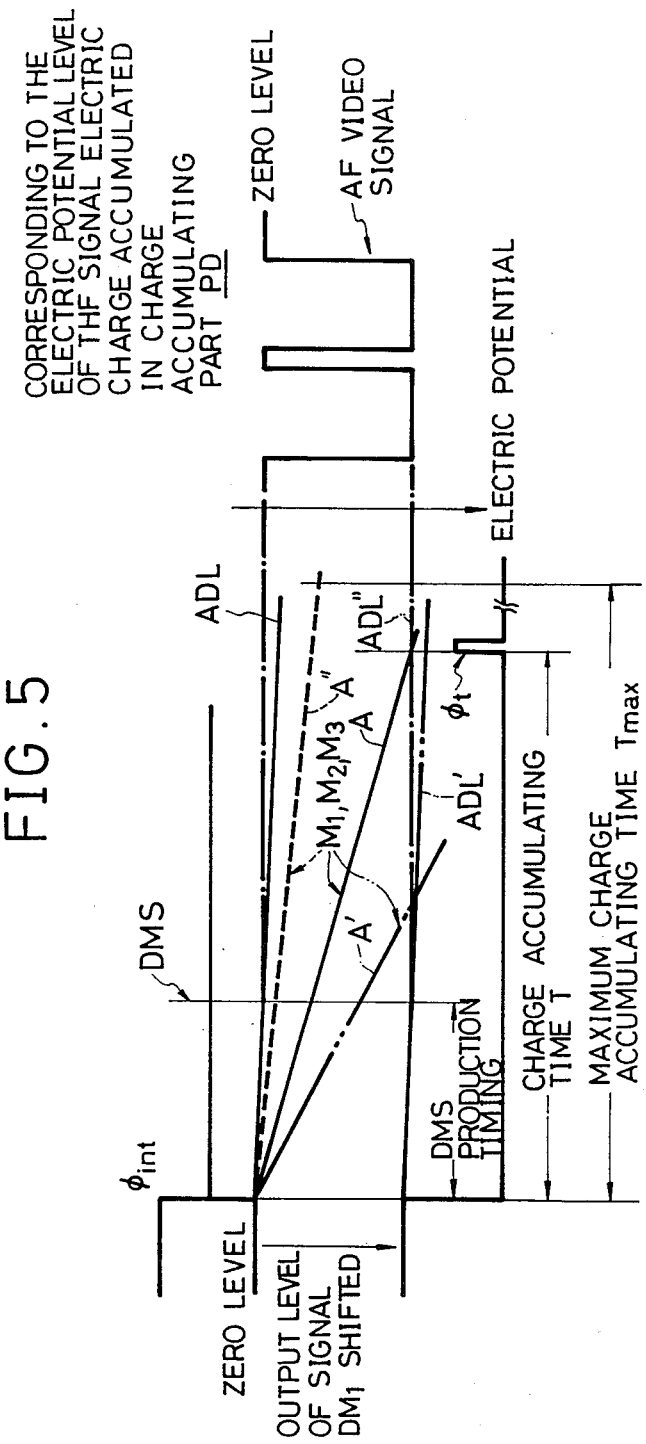
FIG. 5 is a diagram showing the correspondence between the electric charge accumulating time and the AF video signal output waveform.

The time period since the production of the drive command signal $\Phi_{int}$ to the production of the transfer gate signal $\Phi_t$ is the signal electric charge accumulating time T during which signal electric charge is allowed to accumulate in the charge aculating part PD. The charge accumulating time T is relatively short when the object is bright, since the voltage level of the output signals M1, M2 and M3 will fall rapidly, as shown by reference mark A'. When the object is dark, the voltage level of the output signals M1, M2 and M3 will fall slowly and the signal electric charge accumulating time T is relatively long. A predetermined AF video signal can be obtained regardless of the brightness of the object. The waveform shown in the right side of FIG. 5 is a schematic representation of such AF video signal. Where the object is too dark, the transfer gate signal $\Phi_t$ is sometimes not produced regardless of the length of the charge accumulating time. The AF-CPU is therefore programmed to produce the transfer gate signal $\Phi_t$ when a maximum charge accumulating time $T_{max}$ has passed, and a related description will be given later.

The AF video signal is supplied to a dark charge sample hold circuit 35 and to an automatic gain control circuit 37. The automatic gain control circuit 37 is constituted by a comparator 38 and a signal amplifying part 39. The dark charge sample hold circuit 35 is constituted by a switch 40, a capacitor 41 and a feedback circuit (a further circuit) 42, the switch 40 being arranged to be closed upon receiving the dark charge sample hold signal DSH for sample-holding the dark level of the AF video signal.

Figure 6:
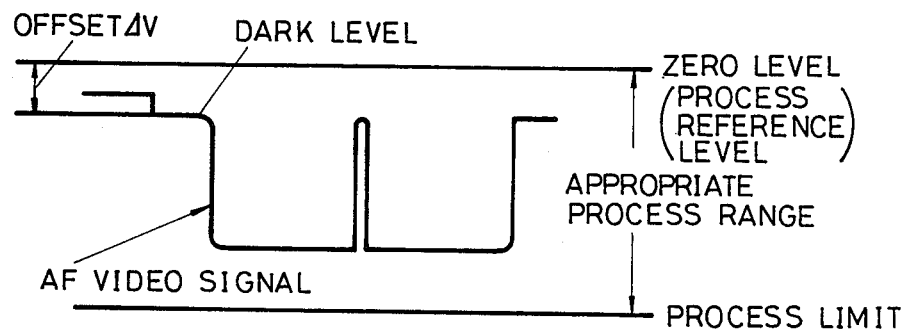
FIG. 6 is a diagram showing the AF video signal before being offset-adjusted.
Figure 7:
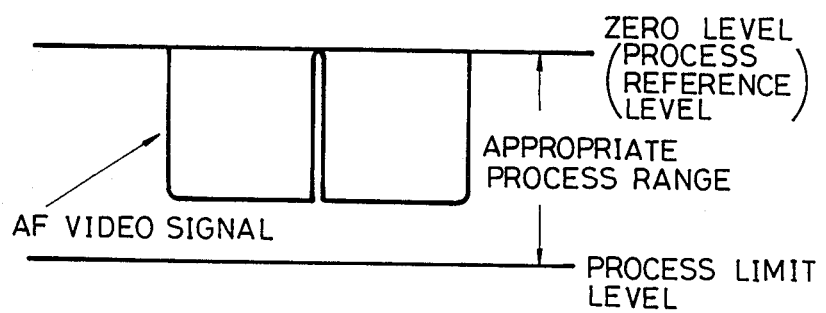
FIG. 7 is a diagram showing the AF video signal after the offset-adjustment.

The AF video signal is offset-adjusted before it is supplied to the automatic gain control circuit 37; the AF video signal not offset-adjusted, before it is supplied to the A/D converter, has an offset $\Delta V$ due to circuit characteristics of the dark charge sample hold circuit 35 and the gain control circuit 37, as shown in FIG. 6. In order to remove the offset $\Delta V$, a data, which is supposed to make the dark level become equal to the process reference level, is beforehand supplied to a D/A converter 30 through terminals DA0–DA5 by means of the D/A converter 30 and a level shift circuit 43. Further, the AF video signal is checked to see if its dark level equals the process base level (zero level) before it is supplied to the A/D converter 34.

If the dark level equals the process reference level, the input data is stored in an electronically erasable programmable read only memory (EEPROM) 44. If the dark level does not equal the process reference level, then the input data is increased or decreased so that the dark level can become equal to the process reference level, and that data is stored in the EEPROM 44 when the equality has been reached. Thus, as a result of such offset adjustment, the AF video signal having the offset removed is supplied to the A/D converter 34, and therefore the converter 30 and the level shift circuit 43 in combination act as an offset adjusting circuit which shifts the AF video signal produced from the photosensor 20 to the process reference level. Therefore, the D/A converter 3 is used both for shifting the reference level of the comparing circuit and for the offset-adjustment.

The level shift circuit 43 includes a shift level varying circuit 44 for stepwise varying the shift level. The shift level varying circuit 44 is constituted by switches 45 and 46 and resistors, and is capable of varying the shift level to 4 steps depending on the combination of the data applied to terminals DAS1 and DAS2. The function of this shift level varying circuit 44 will be described later, and next the arrangement of the automatic gain control circuit 37 will be explained.

The automatic gain control circuit 37 is constituted by terminals GA4, GA8 and GA16, switches connected to these terminals and resistors, and is adapted to close and open the switches 48, 49 depending on the input data applied to the terminals GA4, GA8, GA16 thereby to short-circuiting a selected resistor or resistors, thereby varying the amplification factor. The function of this automatic gain control circuit 37 will be described below, with reference to FIGS. 8 through 12.

Figure 8:
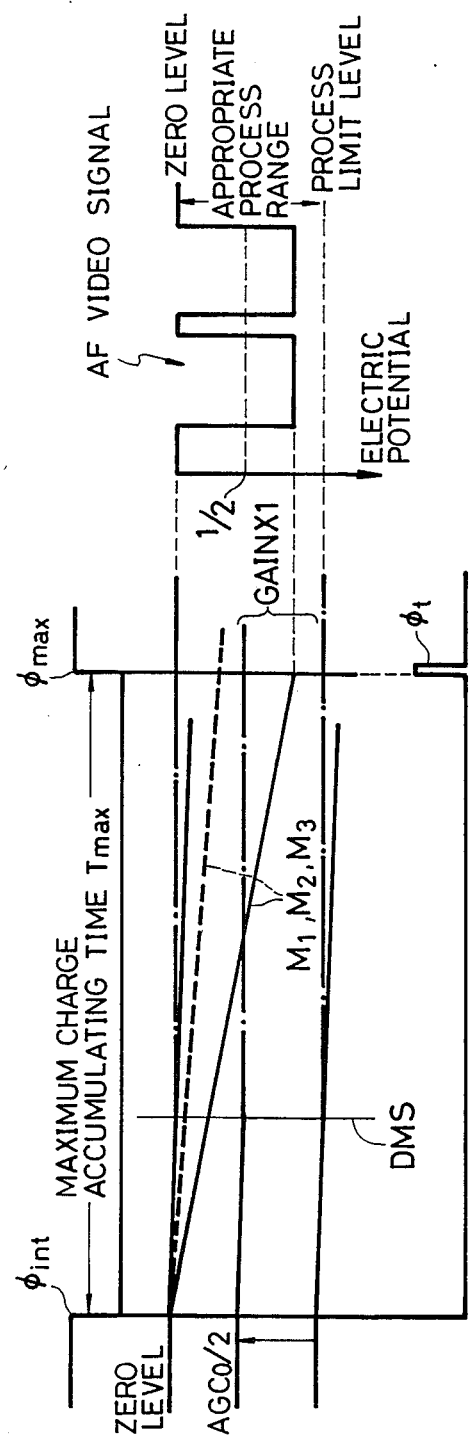
FIG. 8 is a diagram showing the correspondence between the electric charge accumulating time and the AF video signal output waveform in the case of a dark object.
Figure 11:
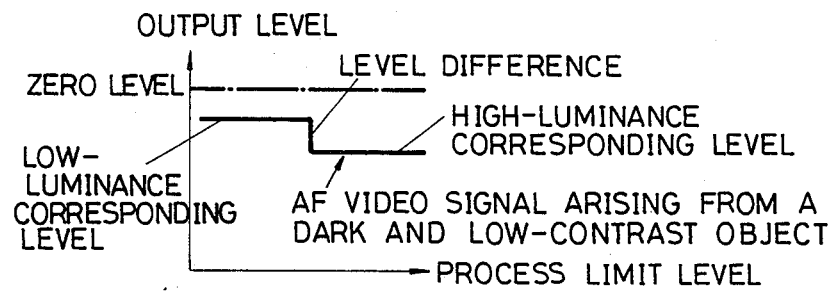
FIG. 11 is a diagram of the AF video signal in the case of a dark and low-contrast object.

When the object is dark, then the voltage levels of the output signals from the exposure monitors M1', M2' and M3' will gradually fall but, as shown in FIG. 8, they cannot reach the process limit level within the maximum charge accumulating time $T_{max}$. Under such conditions, if the AF video signal is transmitted without any further process thereto, then it will have a small low-contrast corresponding level difference which is the difference between its low-luminance corresponding level and high-luminance corresponding level, as shown in FIG. 11. If such AF video signal is supplied to the A/D converter 34 without any further process thereto, then it will provide focus detection data which is little, causing a relatively large error in the focus detection.

Figure 9:
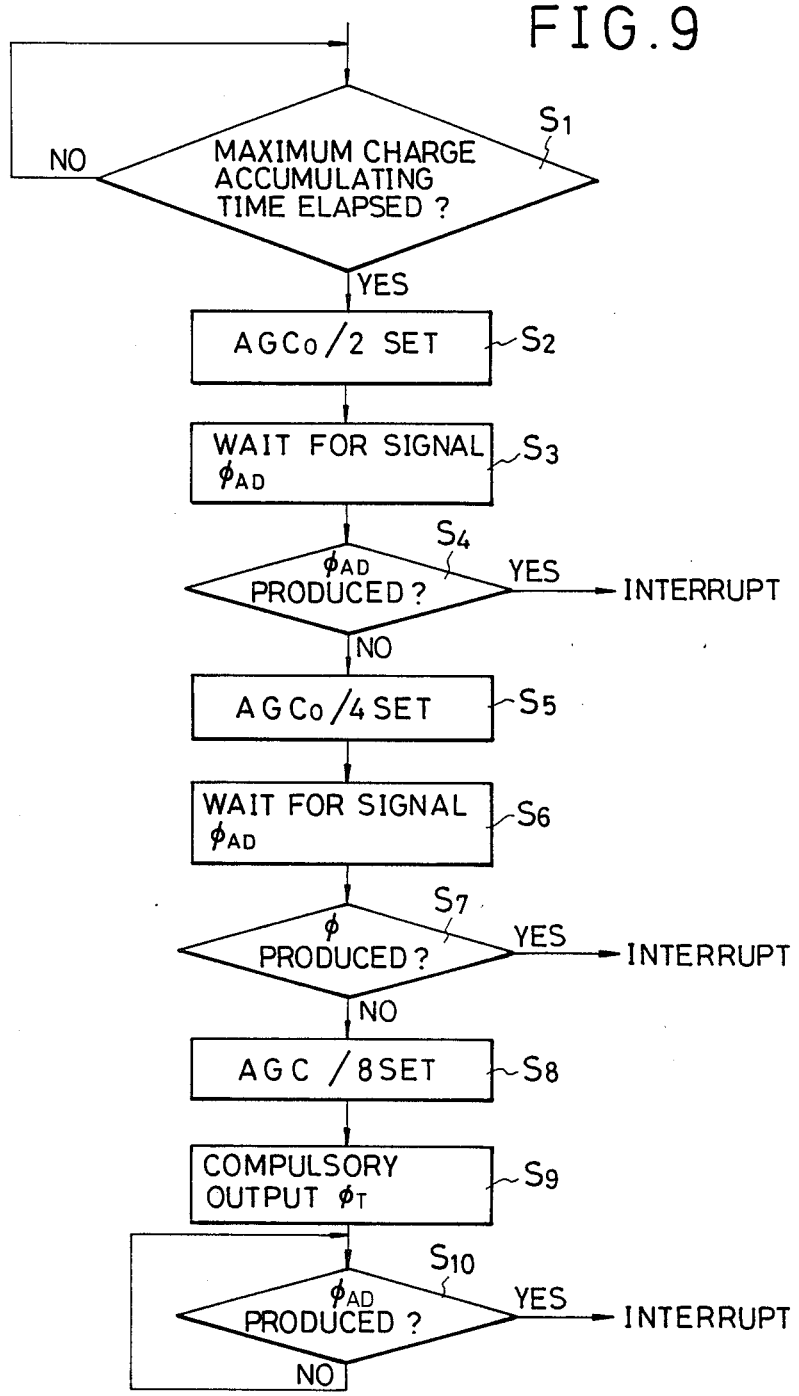
FIG. 9 is a flow chart showing the operation of the AF-CPU in the case of the dark object.

Thus, the AF-CPU will determine whether the maximum charge accumulating time $T_{max}$ has elapsed, as shown in FIG. 9 (step S1).

Next, the reference level of the dark charge monitor DM1' is shifted to $AGC_0/2$ by the D/A converter 30 (step S2).

Then, the occurrence of the drive command signal $\Phi_{AD}$ is waited for (Step S3).

If the output signals M1, M2 and M3 change as shown by a solid line in FIG. 8, the levels of the output signals M1, M2 and M3 will become reversed with respect to the then reference level $AGC_0/2$, and therefore the transfer gate signal $\Phi_t$ is produced at the moment the reference level is shifted to $AGC_0/2$, and the drive command signal $\Phi_{AD}$ is thereby produced.

The waveform of the AF video signal then produced from the photosensor 20 is typically shown in FIG. 8. This AF video signal is within the range from one half to one times the appropriate process range.

If amplitude of such AF video signal is doubled, then it exceeds the limits of the appropriate process range. Such too large AF video signal is, when applied to the A/D converter, will cause distortion. Thus, the gain for the reference level of $AGC_0/2$ is set at unity.

Next, when the the output signals M1, M2 and M3 change as shown by the broken line, the drive command signal $\Phi_{AD}$ will not be produced even if the reference level is shifted to $AGC_0/2$. Thus, it is determined whether or not the drive command signal $\Phi_{AD}$ has been produced (step S4). If the drive command signal $\Phi_{AD}$ has not been produced, then the reference level is shifted to $AGC_0/4$ (step S5). In this case, the AF video signal is between zero and one half times the appropriate process range.

If the output signals M1, M2 and M3 change as shown by the broken line, then the drive command signal $\Phi_{AD}$ is produced. The gain is set at 1X after steps S6 and S7 have been performed. The information for setting the gain at 1X is supplied to the automatic gain control circuit 37 through the terminals GA4–GA16.

If the object is still darker, then $\Phi_{AD}$ will not be produced regardless of the reference level being set at $AGC_0/4$. In such a case, step S8 is performed to cause the transfer gate signal $\Phi_t$ to be compulsorily produced, and the occurrence of $\Phi_{AD}$ signal is waited for (steps S9 and S10).

Figure 10:
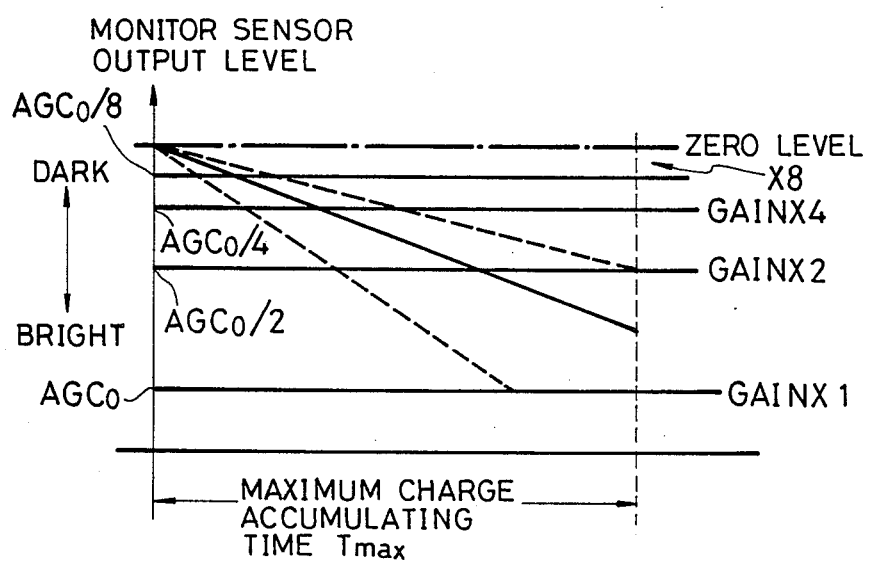
FIG. 10 is an illustrative diagram showing the gain control in the case of the dark object.
Figure 12:
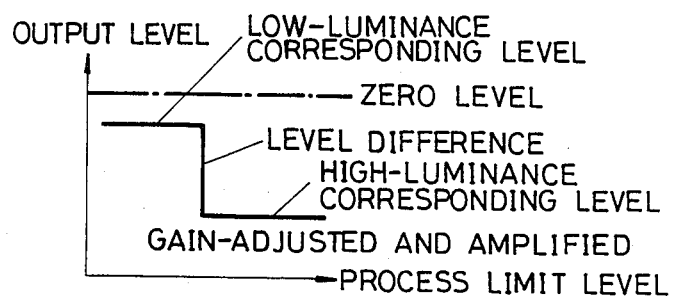
FIG. 12 is an illustrative diagram of the AF video signal shown in FIG. 11, to which a higher gain is given.

Such relationship between the shift of the reference level and the gain is shown in FIG. 10. This gain control ensures that substantially equal AF video signals can be obtained regardless of whether the object is bright or dark, and a typical AF video signal shown in FIG. 11 is amplified to a waveform as shown in FIG. 12.

Next, the function of the shift level varying circuit 44 will be explained, with reference to FIGS. 13 through 16.

Figure 13:
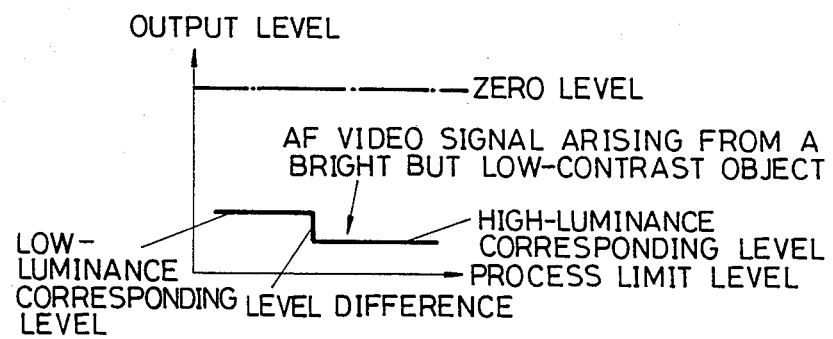
FIG. 13 is a diagram showing the AF video signal arising from a bright but low-contrast object.
Figure 14:
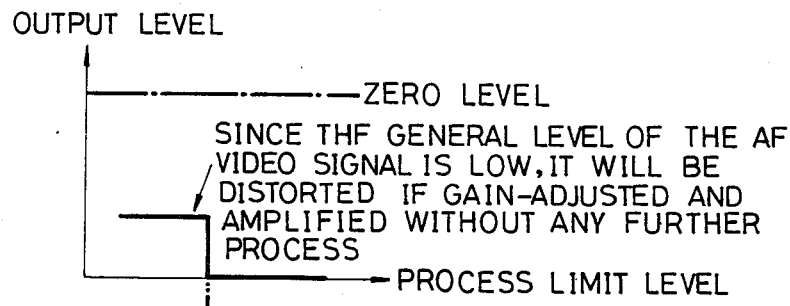
FIG. 14 is an illustrative diagram for emplaining the inconvenience which can accompany the increase of the gain for the AF video signal shown in FIG. 13.

In the case of a bright but low-contrast object, the general level of the AF video signal is lowered as shown in FIG. 13. If the gain is raised for the AF video signal of the generally lowered level, then the lower limit of the AF signal will exceed the process limit level and thus the resultant waveform will be distorted as shown in FIG. 14.

Figure 15:
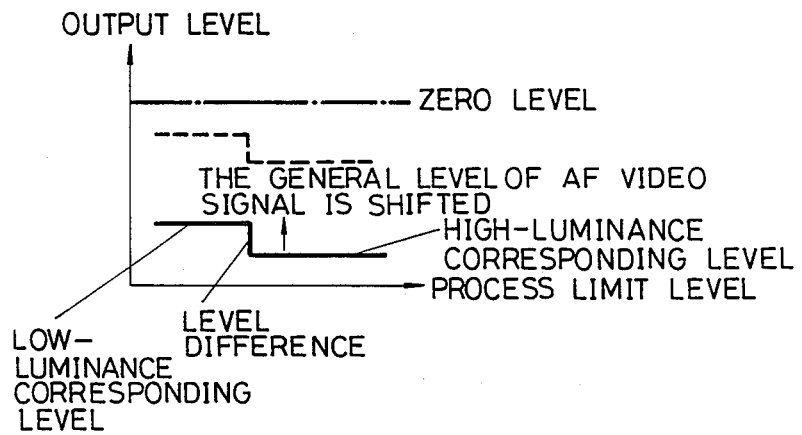
FIG. 15 is an illustrative diagram showing the AF video signal of FIG. 14, wherein its level is generally shifted.
Figure 16:
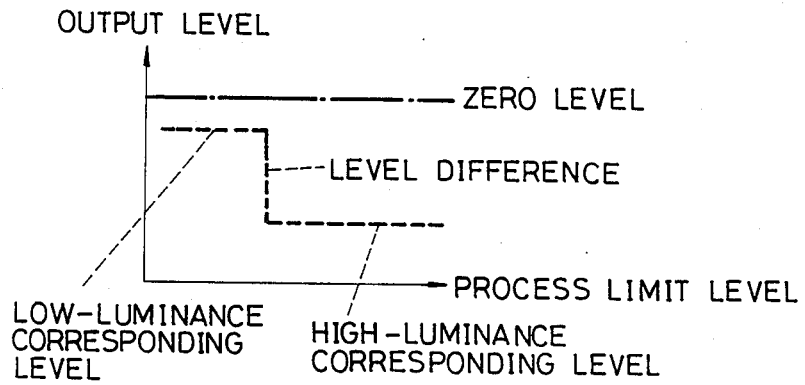
FIG. 16 is a diagram showing the level-shifted AF video signal of FIG. 15, wherein a higher gain is given to the signal.
Figure 17:
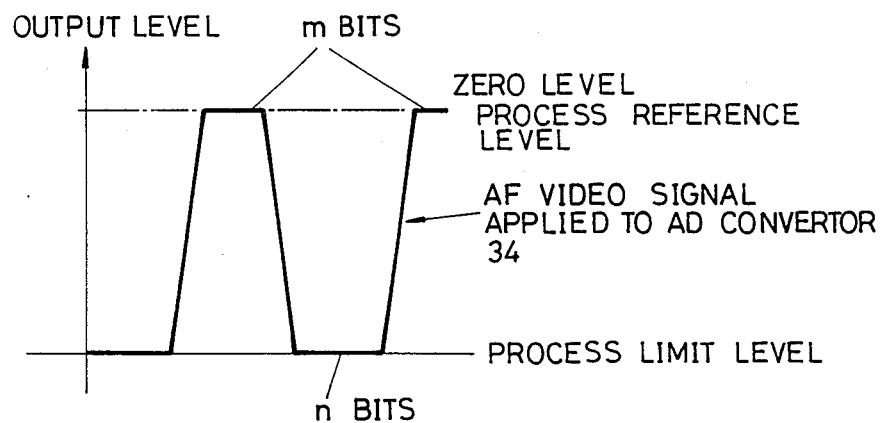
FIG. 17 is an illustrative diagram showing an example of gain changeover.
Figure 18:
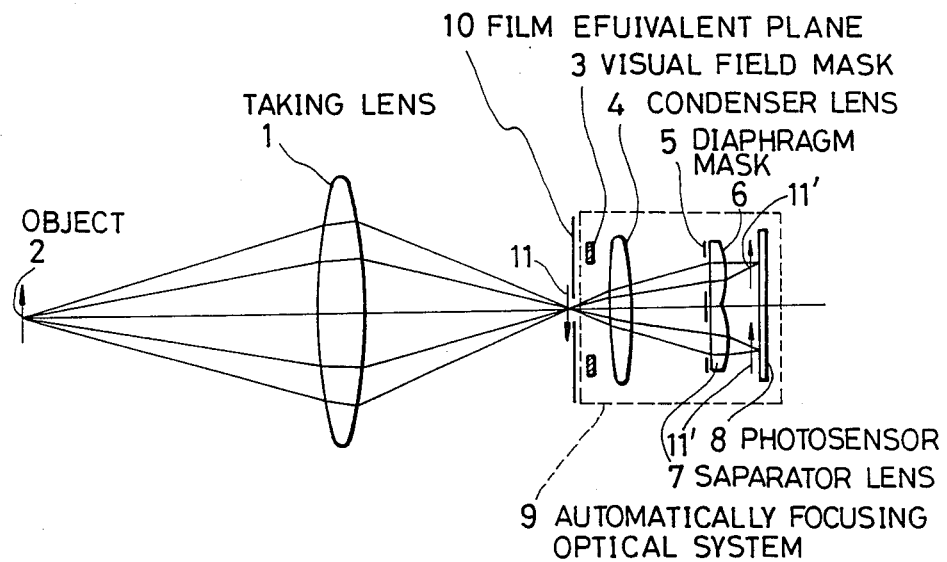
FIG. 18 is a schematic diagram showing an automatic focusing optical system.
Figure 19:
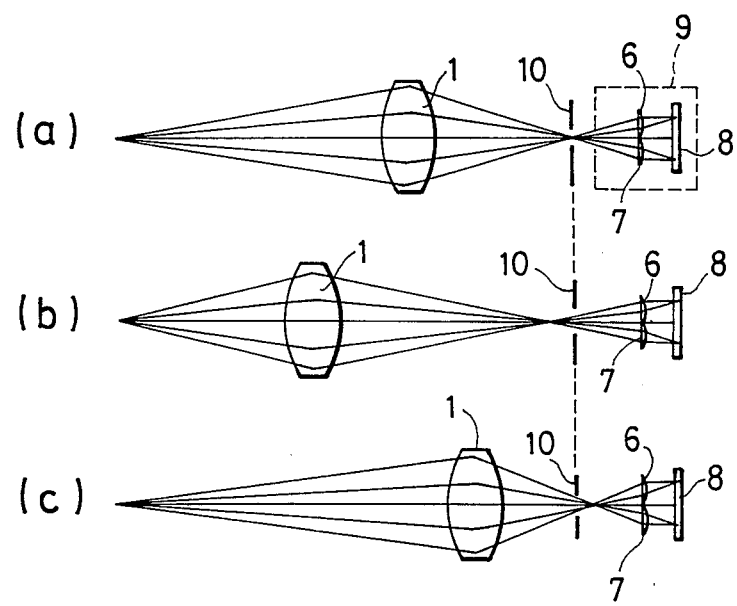
FIGS. 19 and 20 are diagrams for explaining the method of detecting the suitably focused condition using such automatic focusing optical system.
Figure 20:
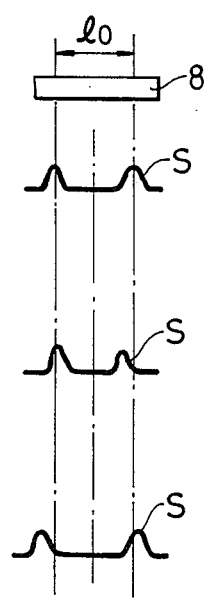

Thus, in the case of a bright but low-contrast object, the shift level varying circuit 44 will shift the general level of the AF video signal such that it approaches the process reference level (zero level) as shown in FIG. 15, and subsequently the gain is raised and adjusted such that the AF video signal is within the appropriate process range as shown in FIG. 16.

Where the general level of the AF video signal is shifted toward the process reference level and subsequently the gain is adjusted, the AF video signal automatically gain-controlled and supplied to the A/D converter 34 may exceed the appropriate process range after a changeover from a low-contrast object to a high-contrast object. In order to avoid this, a check is performed to see whether the process reference level of the A/D converter 34 is over m bits or whether its process limit level is over n bits, as shown in FIG. 17, and, depending on the result, the automatic gain control is temporally removed.

Here, an 8-bit A/D converter 34 is used, so that there is a requirement that m, n≦8.

The above-described embodiment arranged to amplify the AF video signal to obtain an appropriate AF video signal if it arises from a bright but low-contrast object or from a dark and low-contrast object. Therefore, in the above-described embodiment, if the AF video signal contains noise components before amplification, such noise components are also amplified. Since various control actions are made in electronically controlled cameras, such noise components are likely to cause malfunctions of the cameras. It is therefore preferred that the noise components should not be amplified.

In the case of a dark and low-contrast object, the output level from the exposure monitors M1', M2', M3' will fall slowly, so that the charge accumulating time, which is defined by the reversal of the output level from the exposure monitors M1', M2', M3' and the reference level determined by shifting the output level from the dark charge monitor DM1', will be longer than that for the case of a bright but low-contrast object and will approach the maximum charge accumulating time $T_{max}$. Thus, in the case of a dark and low-contrast object, an appropriate AF video signal must be derived by amplifying the AF video signal, so that in this case the contained noise components also must be amplified. In contrast, in the case of a bright but low-contrast object, the charge accumulating time is substantially shorter than the maximum charge accumulating time $T_{max}$, so that the charge accumulating time can be extended. Thus, for a bright but low-contrast object, the reference level is set by shifting the output level from the dark charge monitor DM1' without amplifying so as to extend the charge accumulating time, whereby an AF video signal can be obtained which has a contrast equal to that of an AF video signal which can be obtained by amplification. The AF signal thus obtained by extending the chrge accumulating time will not contain amplified noise components. For example, for a bright but low-contrast object represented in FIG. 13, the integrating time is doubled instead of the gain being doubled. This will provide a signal which is equal to the one shown in FIG. 14, but which will contain noise components, if any, the amount of which will only be half as large as that in the case of an AF video signal obtained by amplification. However, since the high-level corresponding level exceeds the process limits, distortion will occur. Then, by level shift, an undistorted AF video signal shown in FIG. 16 can be obtained, which is substantially equal to an AF video signal obtained by a gain of 2× associated with level shift.

In order to extend the charge accumulating time in a manner described above, firstly, it is determined in Step 1 shown in FIG. 9, whether or not the maximum charge accumulating time $T_{max}$ has lapsed. If not, then whether or not $\Phi_{AD}$ has been generated is determined. If $\Phi_{AD}$ has been generated, then the reference level is changed to $2AGC_0$ (which is double the initial reference level) in order to double the charge accumulating time, and the occurrence of $\Phi_{AD}$ is waited for.

Further, in FIG. 2, reference numerals 50 and 51 denote switches which are rendered conductive by the application thereto of the reference voltage, reference numeral 53 denotes a switch which is rendered nonconductive by an input thereto through a terminal TESIO, and reference numeral 54 denotes a switch which is rendered conductive by the input thereto through the terminal TESIO. Further, in FIG. 2, reference marks R1, R2, R3 and R4 denote resistance values of respective resistors, and the numerals by the side indicate the multiplication factors for the resistance values.

The signal processor for electronically controlled cameras according to the present invention, having an arrangement as described and shown, has an advantage in that it allows to process the AF video signal, depending on the brightness and contrast of the object, into a waveform suitable for obtaining focus detecting data. In addition, when the signal processor is incorporated into elaborate, multifunctional electronically controlled cameras, it will facilitate to design a compact arrangement for such cameras. Further, since an offset adjustment is made, it allows to appropriately process the AF video signal.

What is claimed is:

1. A signal processor for an automatic focusing video signal in an electronically controlled camera, comprising:

a photosensor having an electric charge accumulating part for accumulating a signal electric charge which corresponds to an object brightness, an exposure monitor for accumulating an electric charge which corresponds to the amount of said signal electric charge accumulated in said electric charge accumulating part, and a dark charge monitor for accumulating a dark charge therein, said photosensor being adapted to sequentially transmit said signal electric charge accumulated in said electric charge accumulating part; and an automatic gain control circuit for automatically controlling the gain of said automatic-focusing video signal produced from said photosensor when said object contrast is low, in such a manner that a low-contrast corresponding level difference, which is the difference between a high-luminance corresponding level and a low-luminance corresponding level of an automatic-focusing video signal arising from a low-contrast object, approaches a high-contrast corresponding level difference, which is the difference between a high-luminance corresponding level and a low-luminance corresponding level of an automatic-focusing video signal arising from a high-contrast object.

2. A signal processor for an automatic-focusing video signal in an electronically controlled camera as claimed in claim 1, further comprising:

an A/D converter having an appropriate process range that is bounded by a process reference level and a process limit level;

a comparing circuit for setting a reference level by shifting the output level from said dark charge monitor such that the electric potential of said signal electric charge accumulated in said electric charge accumulating part reaches a predetermined level, and for producing an output signal to produce a transfer command signal to cause said signal electric charge to be transmitted for transfer when said reference level is relatively large as compared to the output level from said exposure monitor;

an offset adjusting circuit for shifting said video signal produced from said photosensor to said process reference level, so as to adjust the offset of said video signal from said process reference level due to circuit characteristics; and a D/A converter for setting the amount of said reference level shift by said comparing circuit, wherein said D/A converter is also used for adjusting the offset of said video signal.

3. A signal processor for an automatic-focusing video signal in an electronically controlled camera, comprising:

a photosensor having an electric charge accumulating part for accumulating a signal electric charge which corresponds to an object brightness, an exposure monitor for accumulating an electric charge which corresponds to the amount of said signal electric charge accumulated in said electric charge accumulating part to an A/D converter;

an automatic gain control circuit for automatically controlling the gain of said automatic-focusing video signal produced from said photosensor when said object contrast is low, in such a manner that a low-contrast corresponding level difference, which is the difference between a high-luminance corresponding level and a low-luminance corresponding level of an automatic-focusing video signal arising from a low-contrast object, approaches a high-contrast corresponding level difference, which is the difference between a high-luminance corresponding level and a low-luminance corresponding level of an automatic-focusing video signal arising from a high-contrast object;

there being an appropriate process range for said A/D converter, said range being bounded by a process reference level and a process limit level; and a level shift circuit for shifting a general level of said automatic-focusing video signal toward said process reference level when said general level of said automatic-focusing video signal corresponding to said object brightness has changed, and for cooperating with said automatic gain control circuit so as to adjust said automatic-focusing video signal within said appropriate process range.

4. A signal processor for an automatic-focusing video signal in an electronically controlled camera as claimed in claim 3, further comprising:

an A/D converter having an appropriate process range that is bounded by a process reference level and a process limit level;

a comparing circuit for setting a reference level by shifting the output level from said dark charge monitor such that the electric potential of said signal electric charge accumulated in said electric charge accumulating part reaches a predetermined level, and for producing an output signal to produce a transfer command signal to cause said electric charge to be transmitted for transfer when said reference level is relatively large as compared to the output level from said exposure monitor;

an offset adjusting circuit for shifting said video signal produced from said photosensor to said process reference level, so as to adjust the offset of said video signal from said process reference level due to circuit characteristics; and a D/A converter for setting the amount of said reference level shift by said comparing circuit, wherein said D/A converter is also used for adjusting the offset of said video signal.

5. A signal processor for automatic focusing video signal in an electronically controlled camera, comprising:

a photosensor having an electric charge accumulating part for accumulating a signal electric charge which corresponds to an object brightness, an exposure monitor for accumulating an electric charge which corresponds to the amount of said signal electric charge accumulated in said electric charge accumulating part, and a dark charge monitor for accumulating a dark charge therein, said photosensor being adapted to sequentially transmit said signal electric charge accumulated in said electric charge accumulating part to an A/D converter;

an automatic gain control circuit for automatically controlling the gain of said automatic-focusing video signal produced from said photosensor when said object contrast is low, in such a manner that a low-contrast corresponding level difference, which is the difference between a high-luminance corresponding level and a low-luminance corresponding level of an automatic-focusing video signal arising from a low-contrast object, approaches a high-contrast corresponding level difference, which is the difference between a high-luminance corresponding level and a low luminance corresponding level of an automatic-focusing video signal arising from a high-contrast object;

there being an appropriate process range for said A/D converter, said range being bounded by a process reference level and a process limit level;

a level shift circuit for shifting a general level of said automatic-focusing video signal toward said process reference level when said general level of said automatic-focusing video signal corresponding to said object brightness has changed, and to cooperate with said automatic gain control circuit so as to adjust said automatic-focusing video signal within said appropriate process range; and an arithmetic processing unit for removing said automatic gain control;

said arithmetic processing unit being arranged to remove said automatic gain control after a change-over from a low-contrast object to a high-contrast object, depending on whether or not said automatic-focusing video signal, to which said automatic gain control has been applied and which has been supplied to said A/D converter, is within said appropriate process range.

6. A signal processor for an automatic-focusing video signal in an electronically controlled camera as claimed in claim 5, further comprising:
   an A/D converter having an appropriate process range that is bounded by a process reference level and a process limit level;
   a comparing circuit for setting a reference level by shifting the output level from said dark charge monitor such that the electric potential of said signal electric charge accumulated in said electric charge accumulating part reaches a predetermined level, and for producing an output signal to produce a transfer command signal to cause said signal electric charge to be transmitted for transfer when said reference level is relatively large as compared to the output level from said exposure monitor;
   an offset adjusting circuit for shifting said video signal produced from said photosensor to said process reference level, so as to adjust the offset of said video signal from said process reference level due to circuit characteristics; and
   a D/A converter for setting the amount of said reference level shift by said comparing circuit, wherein said D/A converter is also used for adjusting the offset of said video signal.

7. A signal processor for an automatic-focusing video signal in an electronically controlled camera, comprising:
   a photosensor having an electric charge accumulating part for accumulating a signal electric charge which corresponds to an object brightness, an exposure monitor for accumulating an electric charge which corresponds to the amount of said signal electric charge accumulated in said electric charge accumulating part, and a dark charge monitor for accumulating a dark charge therein, said photosensor being adapted to sequentially transmit said signal electric charge accumulated in said electric charge accumulating part;
   a comparing circuit for setting a reference level by shifting the output level from said dark charge monitor such that the electric potential of said signal electric charge accumulated in said electric charge accumulating part reaches a predetermined level, and for producing an output signal to produce a transfer command signal to cause said signal electric charge to be transmitted for transfer when said reference level is relatively large as compared to the output level from said exposure monitor;
   an offset adjusting circuit for shifting said video signal produced from said photosensor to said process reference level, so as to adjust the offset of said video signal from said process reference level due to circuit characteristics; and
   a D/A converter for setting the amount of said reference level shift by said comparing circuit, wherein said D/A converter also serves to adjust the offset of said video signal.

8. A signal process for an automatic-focusing video signal in an electronically controlled camera as claimed in claim 7, wherein values of said offset are stored in an electronically erasable programmable read only memory.

9. A signal process for an automatic-focusing video signal in an electronically controlled camera comprising:
   a photosensor having an electric charge accumulating part for accumulating a signal electric charge which corresponds to the brightness, of an object, an exposure monitor for accumulating an electric charge therein which corresponds to the amount of said signal electric charge accumulated in said electric charge accumulating part, and a dark charge monitor for accumulating a dark charge therein, said photosensor being adapted to sequentially transmit said signal electric charge accumulated in said electric charge accumulating part for transfer to an A/D converter; and
   a control device for expanding the accumulating time for said electric charge accumulating part when said object has a low contrast.

10. A signal processor for an automatic-focusing video signal in an electronically controlled camera as claimed in claim 9, further comprising:
    an A/D converter for receiving said automatic-focusing video signal;
    there being an appropriate process range for said A/D converter, said range being bounded by a process reference level and a process limit level; and
    a level shift circuit for shifting a general level of said automatic-focusing video signal arising from a bright but low-contrast object, toward said process reference level, whereby those automatic-focusing video signals which arise from bright but low-contrast objects can be adjusted within said appropriate process range.

* * * * *

UNITED STATES PATENT AND TRADEMARK OFFICE
CERTIFICATE OF CORRECTION

PATENT NO. : 4,876,603

DATED : October 24, 1989

INVENTOR(S) : N. SUZUKI et al.

It is certified that error appears in the above-identified patent and that said Letters Patent is hereby corrected as shown below:

At column 1, line 16, change "focuss" to ---focus---.
At column 1, line 22, delete "a" before "separator".
At column 1, line 31, delete "in".
At column 1, line 33, change "has" to ---have---.
At column 1, line 36, change "wihich" to ---which---.
At column 1, line 38, change "film-euivalent" to ---film-equivalent---.
At column 1, line 39, change "separater" to ---separator---.
At column 1, line 51, change "defocuging" to ---defocusing---.
At column 1, line 57, change "necesary" to ---necessary---.
At column 1, line 60, change "sinal" to ---signal---.
At column 1, line 63, change "vidio" to ---video---.
At column 2, line 4, change "singnal" to ---signal---.
At column 2, line 5, change "elctric" to ---electric---.
At column 2, line 7, change "curcuit" to ---circuit---.
At column 2, line 10, change "accumulaing" to ---accumulating---.
At column 2, line 57, change "gneral" to ---general---.
At column 3, line 19, change "cirtuit" to ---circuit---.
At column 4, line 20, change "emplaining" to ---explaining---.
At column 4, line 62, change "elctric" and "electrc" to ---electric---.
At column 5, line 2, change "shwon" to ---shown---.
At column 5, line 37, change "funtion" to ---function---.
At column 5, line 68, change "adequete" to ---adequate---.
At column 6, line 21, change "receives" to ---receive---.
At column 6, line 24, change "sifted" to ---shifted---.
At column 6, line 46, change "20" to ---20'---.

UNITED STATES PATENT AND TRADEMARK OFFICE
CERTIFICATE OF CORRECTION

PATENT NO. : 4,876,603

DATED : October 24, 1989

INVENTOR(S) : N. SUZUKI et al.

It is certified that error appears in the above-identified patent and that said Letters Patent is hereby corrected as shown below:

```
        At column 6, line 55, change "acculating" to ---
accumulating---.
        At column 7, line 42, change "3" to ---30---.
        At column 7, line 30, delete "44".
        At column 7, line 34, delete "44".
        At column 9, line 25, insert ---is--- after "embodiment".
        At column 9, line 61, change "chrge" to ---charge---.
```

Signed and Sealed this

Third Day of May, 1994

Attest:

BRUCE LEHMAN

*Attesting Officer*   *Commissioner of Patents and Trademarks*